(12) United States Patent
Warren

(10) Patent No.: US 7,140,182 B2
(45) Date of Patent: Nov. 28, 2006

(54) ENERGY STORING ENGINE

(76) Inventor: Edward Lawrence Warren, 3912 Snowy Egret Dr., West Melbourne, FL (US) 32904

( * ) Notice: Subject to any disclaimer, the term of this patent is extended or adjusted under 35 U.S.C. 154(b) by 124 days.

(21) Appl. No.: 10/867,332

(22) Filed: Jun. 14, 2004

(65) Prior Publication Data
US 2005/0274334 A1 Dec. 15, 2005

(51) Int. Cl.
F01B 29/04 (2006.01)
F02B 33/00 (2006.01)
F02P 3/06 (2006.01)
F02C 3/00 (2006.01)

(52) U.S. Cl. ............ 60/712; 123/68; 123/597; 60/39.63

(58) Field of Classification Search .......... 123/68, 123/59 R, 597; 60/516, 712, 39.63
See application file for complete search history.

(56) References Cited

U.S. PATENT DOCUMENTS

| | | | |
|---|---|---|---|
| 3,708,979 A | 1/1973 | Bush et al. | 60/516 |
| 4,040,400 A | 8/1977 | Kiener | 123/68 |
| 4,133,172 A * | 1/1979 | Cataldo | 60/39.63 |
| 4,215,659 A * | 8/1980 | Lowther | 123/68 |
| 4,333,424 A | 6/1982 | McFee | 123/68 |
| 4,476,821 A | 10/1984 | Robinson et al. | 123/68 |
| 4,653,269 A * | 3/1987 | Johnson | 60/39.63 |
| 4,817,388 A * | 4/1989 | Bland | 60/712 |
| 5,179,839 A * | 1/1993 | Bland | 60/712 |
| 6,216,462 B1 * | 4/2001 | Gray, Jr. | 123/597 |
| 6,470,683 B1 * | 10/2002 | Childs et al. | 60/39.6 |

OTHER PUBLICATIONS

U.S. Appl. No. 10/769,657, filed Feb. 2, 2004, Warren.

* cited by examiner

Primary Examiner—Thai-Ba Trieu

(57) ABSTRACT

The Energy Storing Engine is the mechanization of a hot air engine cycle. Constant temperature compression is achieved by using a multi-stage-intercooled compressor. Energy is stored in a compressed air tank. Heat is added at constant pressure by an exhaust gas to compressed air heat exchanger. Heat is added at constant volume by injecting fuel and starting burning immediately above the power piston while the power piston is at the top of its stroke. Adiabatic expansion takes place and produces power output. Energy from storage produces power output. Adiabatic expansion again takes place, and this time produces power output all the way to complete expansion. The displacement of the resulting engine can be varied while the engine is running.

8 Claims, 2 Drawing Sheets

ENERGY STORING ENGINE

BACKGROUND

1. Field of Invention

Figure 1:
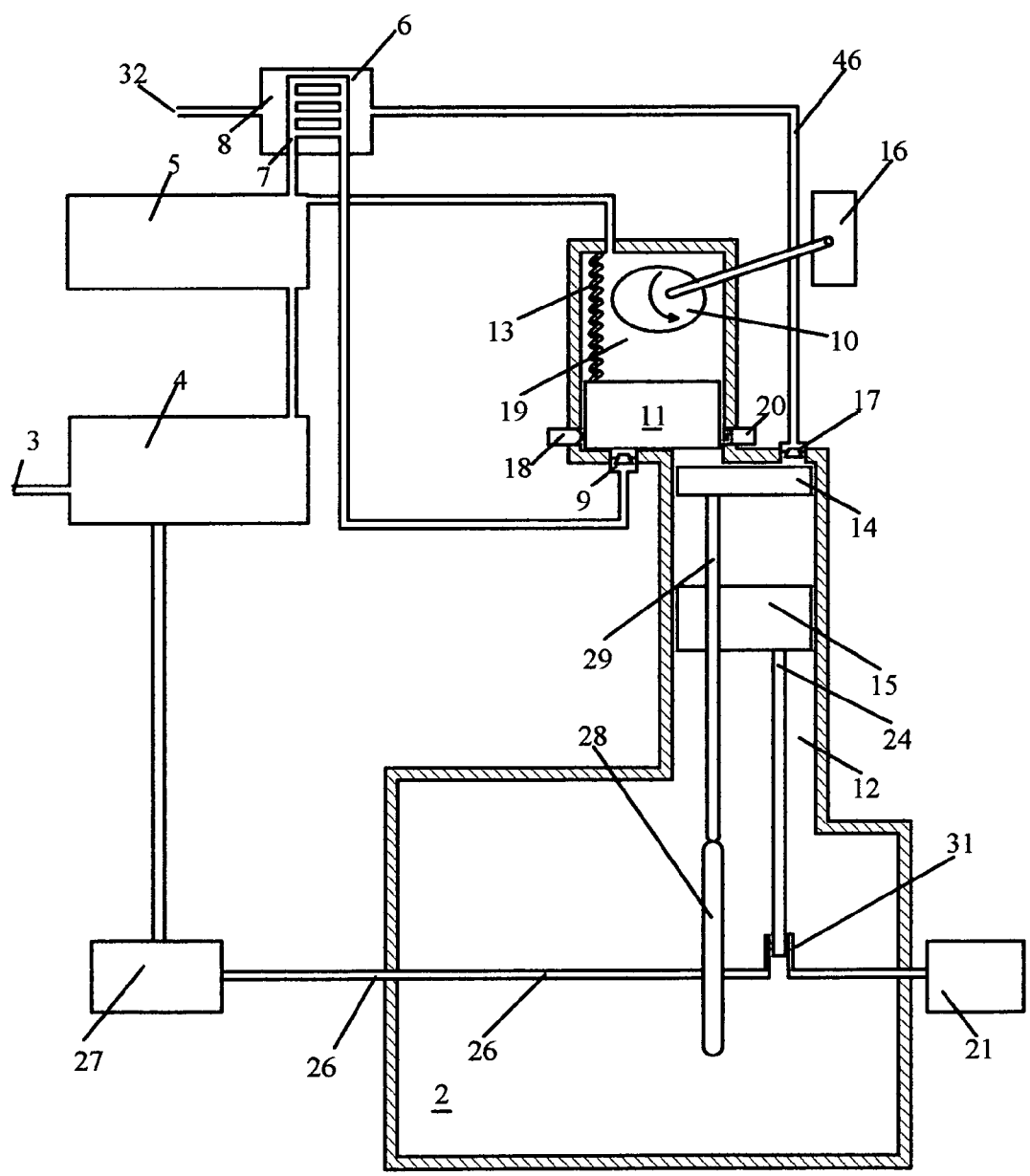

The present invention relates to a reciprocating, internal combustion engine with a multistage intercooled compressor, a heat exchanger, an energy storage chamber, and an energy storing expander.

2. Description of Prior Art

The ways to improve the most popular engine in use today are 1. Separating the compression from the expansion process, 2. Compressing at almost constant temperature, 3. Saving the exhaust heat and using it to heat the compressed air, 4. Changing the engine displacement to match the load while the engine runs, and 5. Storing the hot compressed air so that heat can be added at constant volume. 6. Recovering the energy of the stored air. 7. Using a dynamic brake to slow the load and using the power to compress air into a storage tank.

U.S. Pat. No. 3,708,979 to Bush et al. (1973), U.S. Pat. No. 4,040,400 to Kiener (1977), U.S. Pat. No. 4,333,424 to McFee (1982), U.S. Pat. No. 5,179,839 to Bland (1993), U.S. Pat. No. 4,817,388 to Bland (1989), and U.S. Pat. No. 4,476,821 to Robinson et al (1984) have attempted to achieve one or more of the above.

U.S. Pat. No. 5,179,839 to Bland (1993) and U.S. Pat. No. 4,817,388 to Bland (1989) attempted to change the displacement while the engine ran, but Bland only changed the amount of air and fuel entering the engine. There is no corresponding change to the stroke of the power piston. In Bland the power piston goes all the way to the bottom of the piston. If the charge is too small a vacuum forms in the cylinder. In addition Bland has a valve obstructing the action of the charge on the power piston while the charge is burning and expanding.

What is needed is to change the engine displacement (the amount of air, fuel and piston travel) to match the load while the engine runs, storing the hot compressed air in such a way that the pressure rise from heat can be obtained at near constant volume, and applying that pressure directly to the power piston.

SUMMARY

The present invention is an approximate mechanization of a hot air engine cycle comprising constant temperature compression, heat added from regeneration at constant pressure, energy stored, heat added at constant volume, adiabatic expansion, stored energy used, adiabatic expansion, heat rejected to regeneration, and heat rejected from cooling compression. Approximate constant temperature compression is achieved by using a multi-stage-intercooled compressor. Heat is added at constant pressure by means of an exhaust gas to compressed air heat exchanger. Energy is stored in a spring and compressed air. Heat is added at constant volume. Approximate constant volume is achieved by keeping the power piston close to the top of the expansion cylinder. Adiabatic expansion takes place. Stored energy is used for expansion. Adiabatic expansion can take place all the way to ambient pressure. The method to keep the power piston at the top of the expansion cylinder is a cam. The displacement of the resulting engine can be varied while the engine is running by a variable stop limiting the travel of a movable wall in an energy storage chamber. The engine has dynamic braking by means of a compressor pushing air into a storage tank. Energy is stored by a spring moving cold compressed air out of an energy storage chamber and allowing hot compressed air into an energy storage chamber.

OBJECTS AND ADVANTAGES

The "Energy Storing Engine" has the following advantages:

It changes its size, that is the amount of air, fuel, and power piston stroke, while the engine is operating.

It can operate at constant speed with a varying load

It operates on a very efficient thermodynamic cycle.

It operates with more than or less than complete expansion.

Heat is added to the compressed air at constant volume so that more work can be done with the heat that is added.

It changes the amount of air expanded by the engine to match the engine power to the load requirements.

When the load slows down it saves the inertia work and reuses it.

It is quiet.

The compression and the expansion volumes are separated. The heat from one not affect the other.

DRAWING FIGURES

FIG. 1 shows preferred embodiment of the engine with approximate constant volume heating achieved by keeping the power piston 14 close to the top of the expansion cylinder 12 using push rod 29 and cam 28 to move it to the top and to keep it there until pusher piston 15 catches up.

Figure 2:
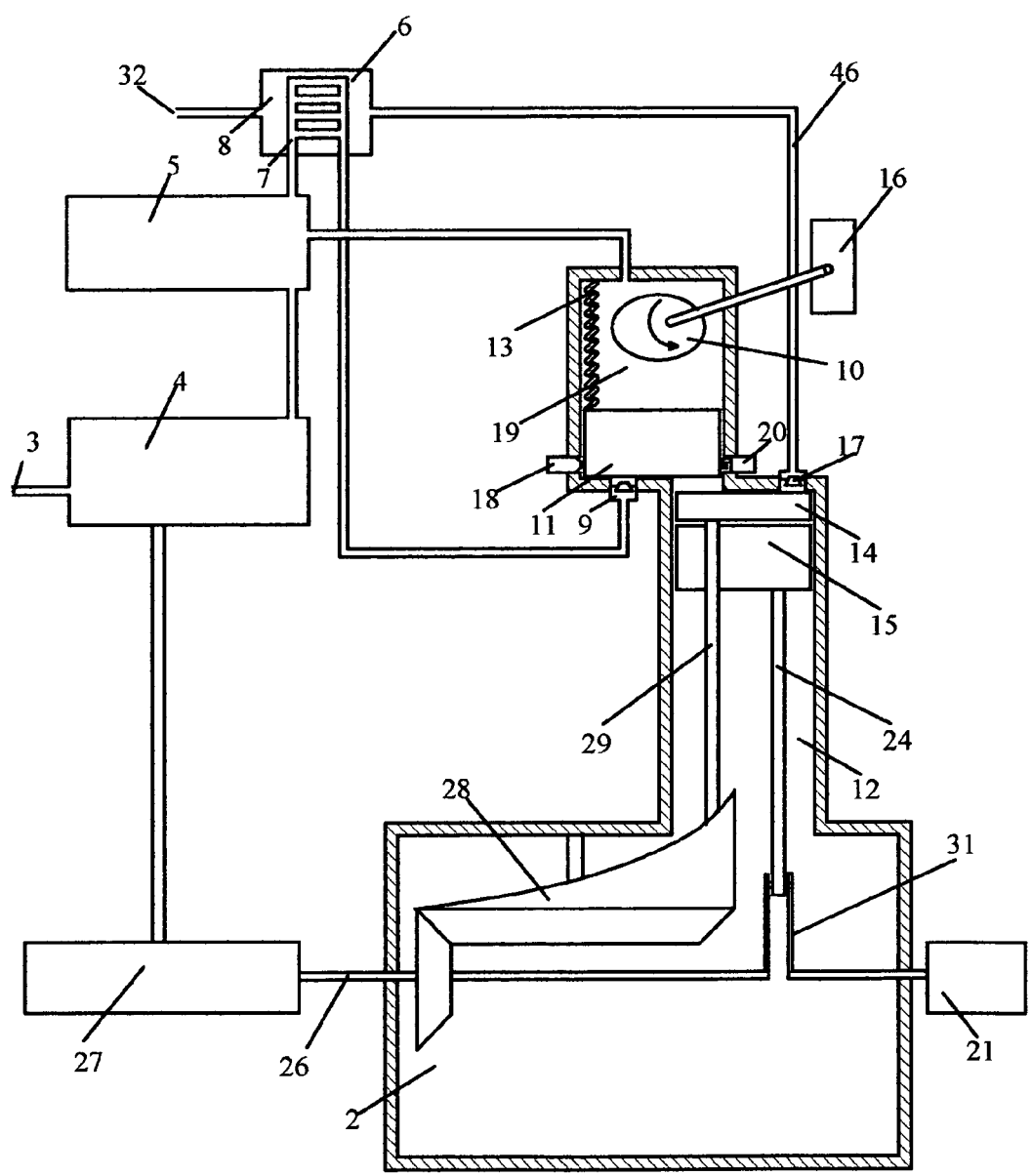

FIG. 2 shows a different style cam.

REFERENCE NUMERALS IN DRAWINGS 2 energy-storing expander
3 air inlet
4 multi-stage-intercooled compressor
5 compressed air storage tank
6 heat exchanger
7 heat exchanger high-pressure side
8 heat exchanger low-pressure side
9 inlet valve
10 stop
11 movable wall
12 expansion cylinder
13 spring
14 power piston
15 pusher piston
16 stop position controller
17 exit valve
18 fuel injector
19 energy storage chamber
20 igniter
21 load
24 pusher piston connecting rod
26 power output shaft
27 variable speed transmission
28 cam
29 push rod
31 pusher piston connecting rod crank
32 exhaust exit
46 ducting

DESCRIPTION—FIG. 1—PREFERRED EMBODIMENT

The preferred embodiment of this invention is the mechanization of a hot air engine cycle comprising nearly constant temperature compression, heat added from regeneration at near constant pressure, energy stored, heat added at nearly constant volume, close to adiabatic expansion, stored energy used, close to adiabatic expansion, heat rejected to regeneration.

Air is taken in through air inlet 3, and approximate constant temperature compression is achieved by using multi-stage-intercooled compressor 4. The compressed air is stored in compressed air storage tank 5. Heat is added to the compressed air at constant pressure by heat exchanger 6. Heat exchanger 6 is comprised of heat exchanger high-pressure side 7 and heat exchanger low-pressure side 8.

The hot compressed air is then used to drive energy-storing expander 2. Energy-storing expander 2 is made up of energy storage chamber 19 and expansion cylinder 12. Energy storage chamber 19 contains inlet valve 9, movable wall 11, spring 13, fuel injector 18, igniter 20, and stop 10. Stop position controller 16 controls the position of stop 10. Expansion cylinder 12 is made up of power piston 14, pusher piston 15, exit valve 17, pusher piston connecting rod 24, cam 28, push rod 29, and power output shaft 26.

The heating means to increase the heat into energy-storing expander 2 at approximately constant volume is achieved by burning the fuel injected by fuel injector 18 and ignited by igniter 20, and by keeping power piston 14 close to the top of expansion cylinder 12. The mechanical means to move power piston 14 close to the top of the expansion cylinder 12 and keep it there until said pusher piston 15 moves to the top of its stroke is push rod 29 and cam 28. Push rod 29 and cam 28 move power piston 14 to the top of expansion cylinder 12 and keep it there until pusher piston 15 catches up. Pusher piston 15 is connected to pusher piston connecting rod 24 and pusher piston connecting rod crank 31 on power output shaft 26 that is connected to load 21 and variable speed transmission 27. Power output shaft 26 drives multi-stage-intercooled compressor 4 through variable speed transmission 27. Exit valve 17 allows the exhaust to flow through ducting 46 to heat exchanger low-pressure side 8.

The engine has only one each of air inlet 3, multi-stage-intercooled compressor 4, compressed air storage tank 5, heat exchanger 6, variable speed transmission 27 and exhaust exit 32, but it can have many energy-storing expanders 2.

Any compressor can be used to compress the air, but to obtain maximum efficiency a compressor should operate as close to constant temperature as possible. For example, this may be accomplished by using multi-stage-intercooled compressor 4 that is driven by energy-storing expander 2 during normal operation, and by the load when the load is slowing down. Variable speed transmission 27 can be used to increase or decrease the amount of air compressed.

The airflow control is shown using check type valves and poppet type valves. These could be replaced with other type flow control devices.

Although the air coming out of the heat exchanger high-pressure side 7 may be hot enough to ignite the fuel, igniter 20 is shown in all figures because it is needed to start the engine.

FIG. 2 shows the engine with a different style cam 28.

OPERATION—FIG. 1—PREFERRED EMBODIMENT

Air enters the engine through air inlet 3, is compressed in multi-stage-intercooled compressor 4, is stored in compressed air storage tank 5, is heated with heat from the exhaust by heat exchanger 6 as it passes through heat exchanger high-pressure side 7. The resulting hot compressed air drives energy-storing expander 2.

The cycle of energy-storing expander 2 starts with exit valve 17 opening, and cam 28 and push rod 29 pushing power piston 14 to the top of expansion cylinder 12 as pusher piston connecting rod crank 31 goes around its bottom travel and starts back up. When power piston 14 reaches the top of expansion cylinder 12 it is kept there by cam 28 and push rod 29. Inlet valve 9 opens.

As the hot compressed air enters energy-storing expander 2 through inlet valve 9, the pressures on the bottom and the top of movable wall 11 become equal then spring 13 moves movable wall 11 until movable wall 11 comes up against stop 10. Stop position controller 16 controls the position of stop 10. Stop 10 controls how far movable wall 11 moves and hence the amount of hot compressed air that goes into energy-storing expander 2. Since stop 10 can be moved while the engine is running, the amount of compressed air used by the engine, and hence the work output of the engine, can be changed as the engine is running.

Near top dead center of pusher piston connecting rod crank 31 pusher piston 15 and power piston 14 come together, fuel is injected, the mixture is ignited, the pressure in energy storage chamber 19 and expansion cylinder 12 increases, and urges power piston 14 and pusher piston 15 along on their power output stroke. When power piston 14 is part way down on it power output stroke, the force exerted by compressed air on the top of movable wall 11 becomes greater than the pressure force on the bottom of movable wall 11. The stored energy is transferred through the hot air mixture to power piston 14 and further urges power piston 14 down. Spring 13 is stretched and strained. After movable wall 11 reaches the bottom of energy storage chamber 19, the expanding mixture in expansion cylinder 12 continues urging power piston 14 downwards until exit valve 17 opens starting a new cycle.

During part of the above cycle, adjustable stop 10 is moved to allow more or less compressed air into energy storage chamber 19. When more compressed air is let into energy storage chamber 19 more power is produced. When less compressed air is let into energy storage chamber 19 less power is produced.

The inertia from the load slowing down can be used to continue to compress air. As the engine uses less air than is compressed, the extra air is stored in compressed air storage tank 5. The extra air that is stored in compressed air storage tank 5 can be used to allow the engine to operate at high power.

CONCLUSION

The "Energy Storing Engine" has the following advantages:

It changes its size, that is the amount of air processed each stroke, while the engine is operating.

It can operate at constant speed with a varying load.

It operates on a very efficient thermodynamic cycle.

It operates with more than or less than complete expansion.

Heat is added to the compressed air at constant volume so that more work can be done with the heat that is added.

It changes the amount of air expanded by the engine to match the engine power to the load requirements.

When the load slows down it saves the inertia work and reuses it.

It is quiet.

The compression and the expansion volumes are separated. The heat from one does not affect the other.

I claim:

1. A method of operating an internal combustion engine, said engine comprising a multi-stage-intercooled compressor, a power transfer means for driving said compressor, a power output shaft for attaching a load, and one or more energy-storing expanders, each energy-storing expander comprising
   a) an energy storage chamber;
   b) a movable wall inside said energy storage chamber with a space above said movable wall open to compressed air from said compressor;
   c) an inlet valve to allow compressed air into the space below said movable wall,
   d) a spring to move said movable wall away from said inlet valve when said inlet valve is open and the pressures above and below said movable wall are equal;
   e) a heating means for increasing the heat in said energy storage chamber;
   f) a cylinder, with said energy storage chamber at one end;
   g) a power piston in said cylinder, which moves in a reciprocating manner;
   h) a pusher piston in said cylinder which moves in a reciprocating manner and transfers pressure forces on said power piston to said power output shaft;
   i) a cam on said power output shaft and a push rod to move said power piston near the energy storage chamber end of said cylinder and keep said power piston there until said pusher piston moves to the top of said pusher piston's stroke in said cylinder;
   j) an exit valve;
   said method of operating said internal combustion engine comprising the steps of:
   compressing air at near constant temperature,
   compressing air at near adiabatic conditions,
   storing energy in said energy storage chamber,
   heating said compressed air at near constant volume,
   expanding the heated compressed air at near adiabatic conditions,
   using the stored energy of said energy storage chamber,
   expanding said heated compressed air at near adiabatic conditions, and
   adjusting said exit valve rejecting said heat to ambient.

2. A method of operating an internal combustion engine, said engine comprising a multi-stage-intercooled compressor, a power transfer means for driving said compressor, a heat exchanger, a power output shaft for attaching a load, and one or more energy-storing expanders, each energy-storing expander comprising
   a) an energy storage chamber;
   b) a movable wall inside said energy storage chamber with a space above said movable wall open to compressed air from said compressor;
   c) an inlet valve to allow compressed air into the space below said movable wall;
   d) a spring to move said movable wall away from said inlet valve when said inlet valve is open and the pressures above and below said movable wall are equal;
   e) a heating means for increasing the heat in said energy storage chamber;
   f) a cylinder, with said energy storage chamber at one end;
   g) a power piston in said cylinder, which moves in a reciprocating manner;
   h) a pusher piston in said cylinder which moves in a reciprocating manner and transfers pressure forces on said power piston to said power output shaft;
   i) a cam on said power output shaft and a push rod to move said power piston near the energy storage chamber end of said cylinder and keep said power piston there until said pusher piston moves to the top of said pusher piston's stroke in said cylinder;
   j) an exit valve;
   said method of operating said internal combustion engine comprising the steps of:
   compressing air at near constant temperature,
   regenerating exhaust heat from exhaust gases,
   transferring said exhaust heat to the compressed air at near constant pressure,
   storing energy in said energy storage chamber,
   heating said compressed air at near constant volume,
   expanding the heated compressed air at near adiabatic conditions,
   using the stored energy of said energy storage chamber,
   expanding said heated compressed air at near adiabatic conditions,
   transferring heat by regenerating from the exhaust to said compressed air, and
   adjusting said exit valve for rejecting said heat to ambient.

3. An internal combustion engine, comprising a compressor, a power transfer means for driving said compressor, a power output shaft for attaching a load, and one or more energy-storing expanders, each energy-storing expander comprising;
   a) an energy storage chamber;
   b) a movable wall inside said energy storage chamber with a space above said movable wall open to compressed air from said compressor;
   c) an inlet valve to allow compressed air into the space below said movable wall;
   d) a spring to move said movable wall away from said inlet valve when said inlet valve is open and the pressures above and below said movable wall are equal;
   e) a heating means for increasing the heat in said energy storage chamber;
   f) a cylinder, with said energy storage chamber at one end;
   g) a power piston in said cylinder which moves in a reciprocating manner;
   h) a pusher piston in said cylinder which moves in a reciprocating manner and transfers pressure forces on said power piston to said power output shaft;
   i) a mechanical means for moving said power piston near the energy storage chamber end of said cylinder and keeping said piston at the energy storage chamber end of said cylinder until said pusher piston moves to the top of its stroke in said cylinder;
   j) an exit valve.

4. The Internal combustion engine of claim 3 further comprising an adjustable stop that limits the movement of said moveable wall is used to regulate the amount of compressed air into said energy storage chamber.

5. The internal combustion engine of claim 3 wherein said mechanical means for moving said power piston to near the energy storage chamber end of said cylinder, and keeping said piston at the energy storage chamber end of said cylinder until said pusher piston moves to the top of its stroke in said cylinder is a push rod moved by a cam on said power output shaft.

6. The internal combustion engine of claim 3 wherein said power transfer means for driving said compressor and for slowing down said load is a variable speed transmission.

7. The internal combustion engine of claim 3 wherein said compressor is a multi-stage-inter-cooled compressor.

8. The internal combustion engine of claim 3 further comprising an exhaust ducting being connected from said energy-storing expander to a compressed air heat exchanger.

* * * * *